(12) United States Patent
Fiorilla et al.

(10) Patent No.: US 11,499,640 B1
(45) Date of Patent: Nov. 15, 2022

(54) EXPANSION JOINT SEAL WITH STATUS SENSOR

(71) Applicant: Schul International Co., LLC, Hudson, NH (US)

(72) Inventors: Nicholas A. Fiorilla, Hudson, NH (US); Michael M. Sebold, Cleveland Heights, OH (US); Donny Wallis, Plaistow, NH (US); Stephen M. Pierson, Lakewood, OH (US)

(73) Assignee: Schul International Co., LLC, Hudson, NH (US)

( * ) Notice: Subject to any disclaimer, the term of this patent is extended or adjusted under 35 U.S.C. 154(b) by 7 days.

(21) Appl. No.: 17/373,723

(22) Filed: Jul. 12, 2021

(51) Int. Cl.
*F16J 15/3296* (2016.01)
*F16J 15/3268* (2016.01)

(52) U.S. Cl.
CPC ....... *F16J 15/3296* (2013.01); *F16J 15/3268* (2013.01)

(58) Field of Classification Search
CPC .. F16J 15/00; F16J 15/02; F16J 15/022; F16J 15/024; F16J 15/3296; F16J 15/326; F16J 15/3268
USPC ....................................................... 277/317
See application file for complete search history.

(56) References Cited

U.S. PATENT DOCUMENTS

| | | |
|---|---|---|
| 9,404,581 B1 | 8/2016 | Robinson |
| 9,915,038 B2 | 3/2018 | Robinson |
| 9,982,428 B2 | 5/2018 | Robinson |
| 10,081,939 B1 | 9/2018 | Robinson |
| 10,087,619 B1 | 10/2018 | Robinson |
| 10,087,620 B1 | 10/2018 | Robinson |
| 10,087,621 B1 | 10/2018 | Robinson |
| 10,125,490 B2 | 11/2018 | Robinson |
| 10,203,035 B1 | 2/2019 | Robinson |
| 10,213,962 B2 | 2/2019 | Robinson |
| 10,233,633 B2 | 3/2019 | Robinson |
| 10,240,302 B2 | 3/2019 | Robinson |
| 10,323,360 B2 | 6/2019 | Robinson |
| 10,323,409 B1 | 6/2019 | Robinson |
| 10,352,003 B2 | 6/2019 | Robinson |
| 10,352,039 B2 | 7/2019 | Robinson |
| 10,358,777 B2 | 7/2019 | Robinson |
| 10,358,813 B2 | 7/2019 | Robinson |
| 10,480,136 B2 | 11/2019 | Robinson |
| 10,480,654 B2 | 11/2019 | Robinson |
| 10,533,315 B2 | 1/2020 | Robinson |
| 10,533,316 B1 | 1/2020 | Robinson |
| 10,544,548 B2 | 1/2020 | Robinson |
| 10,557,263 B1 | 2/2020 | Robinson |
| 10,676,875 B1 | 6/2020 | Robinson |
| 10,787,807 B1 | 9/2020 | Robinson |
| 10,787,808 B2 | 9/2020 | Robinson |
| 10,794,055 B1 | 10/2020 | Robinson |
| 10,808,398 B1 | 10/2020 | Robinson |
| 10,844,959 B2 | 11/2020 | Robinson et al. |
| 10,851,541 B2 | 12/2020 | Robinson |
| 10,851,897 B2 | 12/2020 | Robinson |
| 2017/0159817 A1 | 6/2017 | Robinson |
| 2017/0342665 A1 | 11/2017 | Robinson |

(Continued)

*Primary Examiner* — Nathan Cumar
(74) *Attorney, Agent, or Firm* — Crain, Caton & James, P.C.; James E. Hudson, III

(57) ABSTRACT

An expansion joint seal has a core of resiliently-compressible material, a sensor, and a sensor-signal receiving device to identify internal and/or environmental conditions.

20 Claims, 5 Drawing Sheets

(56) References Cited

U.S. PATENT DOCUMENTS

| | | |
|---|---|---|
| 2018/0002868 A1 | 1/2018 | Robinson |
| 2018/0106001 A1 | 4/2018 | Robinson |
| 2018/0106032 A1* | 4/2018 | Robinson .......... E04F 15/02016 |
| 2018/0119366 A1 | 5/2018 | Robinson |
| 2018/0142465 A1 | 5/2018 | Robinson |
| 2018/0171564 A1 | 6/2018 | Robinson |
| 2018/0238048 A1 | 8/2018 | Robinson |
| 2018/0266103 A1* | 9/2018 | Robinson .............. E04B 1/6812 |
| 2018/0274228 A1 | 9/2018 | Robinson |
| 2018/0300490 A1* | 10/2018 | Robinson .............. E01C 23/028 |
| 2018/0363292 A1 | 12/2018 | Robinson |
| 2019/0057215 A1 | 2/2019 | Robinson |
| 2019/0063608 A1 | 2/2019 | Robinson et al. |
| 2019/0071824 A1* | 3/2019 | Robinson .............. E01C 11/106 |
| 2019/0107201 A1 | 4/2019 | Robinson |
| 2019/0108351 A1* | 4/2019 | Robinson ................ E04B 1/948 |
| 2019/0242070 A1 | 8/2019 | Robinson |
| 2019/0266335 A1 | 8/2019 | Robinson |
| 2019/0271150 A1* | 9/2019 | Robinson ................ E01C 11/12 |
| 2020/0018061 A1* | 1/2020 | Robinson .............. E01C 11/106 |
| 2020/0141113 A1 | 5/2020 | Robinson |
| 2020/0279046 A1 | 9/2020 | Robinson |
| 2020/0325674 A1 | 10/2020 | Robinson |
| 2020/0325675 A1 | 10/2020 | Robinson |
| 2020/0347590 A1 | 11/2020 | Robinson |

\* cited by examiner

EXPANSION JOINT SEAL WITH STATUS SENSOR

CROSS-REFERENCE TO RELATED APPLICATIONS

None.

STATEMENT REGARDING FEDERALLY SPONSORED RESEARCH OR DEVELOPMENT

Not Applicable.

BACKGROUND

Field

The present disclosure relates generally systems to foam-based expansion joint seals for use in expansion joint segments. More particularly, the present disclosure is directed to providing an expansion joint seal having a core of resiliently-compressible material, a sensor, and a sensor-signal receiving device to identify internal and/or environmental conditions.

Description of the Related Art

Building construction requires provision accommodating material responses to temperature fluctuations while providing a water-tight exterior. Construction panels come in many different sizes and shapes and may be used for various purposes, including roadways, sideways, tunnels and other pre-cast structures. To provide a seal against environmental contaminants, expansion joint seals have been developed.

Among expansion joint seals are those which include a core body, predominantly foam, with adhesive on one or more side faces and a water-resistant coating on the exposed face. These expansion joint seals are compressed on site, or may be provided in a compressed form, are worked into the expansion joint to so the top of the expansion joint seal is at or below the top of adjacent substrates, and are permitted to expand to adhere to the exposed sides of adjacent substrates.

These expansion joint seals are generally provided in common lengths and cut or spliced on site to fit the length of the applicable expansion joint. These expansion joint seals can be fitted to straight expansion joints and to those expansion joints with gentle changes in direction. Miter cuts, or other splicing systems, may be used to accommodate corners or abrupt changes in direction. To maintain position, these expansion joint seals are compressed within the joint seal, often at one-half to one-fifth the width of the expansion joint seal prior to compression. Because densities of the foam, prior to compression for use in the joint and/or for delivery to the job site, may range from 10 to 200 $kg/m^3$, resulting in an installed density ranging from 20 to 1000 $kg/m^3$.

Once installed, routine inspection may be performed. Inspection is typically visual inspection to determine if the expansion joint seal has failed, such as by failing to contact one of both of the substrate walls, and thereby allowing particulates into the joint, or has been damaged, such as by destruction of some portion of the visible expansion joint seal body. Visual inspection cannot readily determine if any internal damage has been sustained or any internal changes effected.

It would therefore be beneficial to provide an expansion joint which does not suffer from these impediments.

SUMMARY

The present disclosure therefore meets the above needs and overcomes one or more deficiencies in the prior art.

The present disclosure provides a seal for an expansion joint, which has a core, a sensor and a sensor-signal receiving device, where the core is of a resiliently compressible material, the core having an elongate body, the sensor having a sensor top and a sensor external surface, the sensor external surface contacting the core, the sensor configured to emit a sensor signal, and where the sensor external surface has one of a coefficient of friction of 0.4 or greater or a barb, and where the sensor-signal receiving device is selected from the group consisting of a passive, low frequency transponder and a microcontroller and where the sensor-signal receiving device is configured to receive the sensor signal, where the sensor in is electrical communication with the sensor-signal receiving device.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

The present disclosure provides an expansion joint seal having a core of resiliently-compressible material, a sensor, and a sensor-signal receiving device to identify internal and/or environmental conditions functions without providing uniform expansion forces throughout, while reducing waste and avoiding performance failures caused by unequally distributed additives and the resulting unequal densities of the modified foam.

Figure 1:
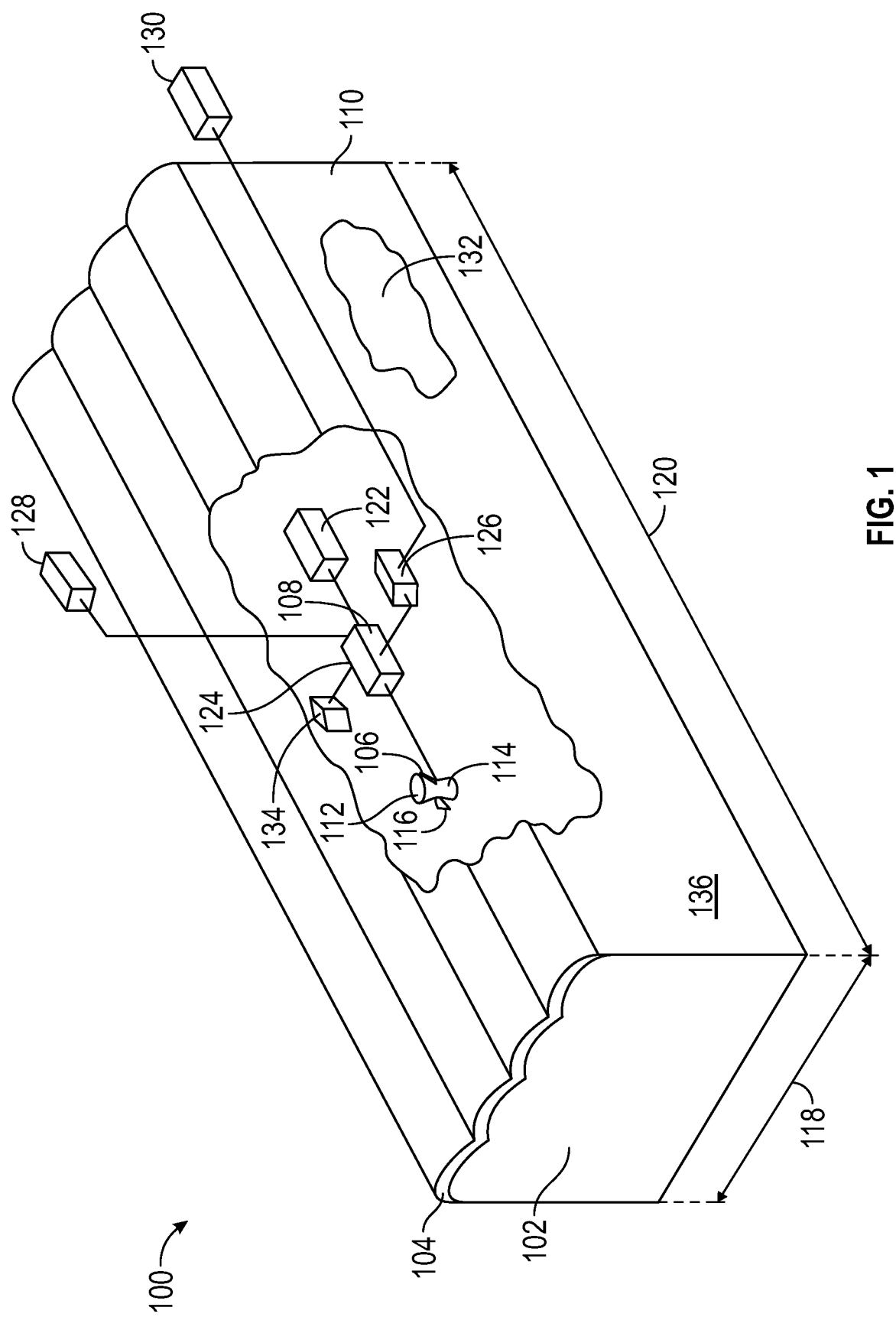
FIG. 1 provides an isometric view of the present invention.

Referring to FIG. 1, an isometric view of the present invention is provided. A seal 100 for an expansion joint is provided for use in an expansion joint which includes a core 102, a sensor 106, and a sensor-signal receiving device 108. Such seals 100 are often covered on the exposed surface with an elastomeric layer 104. While the seal 100 includes an elastomeric layer 104, the sensor 106 is positioned below the elastomeric layer 104 and does not interfere with the operation of the elastomeric layer 104. To facilitate the compression and expansion of the seal 100 during operation, the core 102 and elastomeric layer 104 may constructed to result in a scalloped surface when installed. Silicone had been found to be a preferred coating for the elastomeric layer 104, but the current invention is not limited to silicone coatings and would alternatively include hybrid gunnable sealants such as silicone-polyurethane, and other construction sealants and coatings such as polyurethane, polysulfide, acrylic, intumescent, fire-resistant, UV, mildew and other coatings that would add a useful hybrid function to the impregnated foam and known to those skilled in the art.

The core 102 is selected from a core of a resiliently compressible material which is compressible between adjacent substrates of the expansion joint. Due to substrate expansion and compression, the expansion joint may move be reduced to fifty percent (50%) of expansion joint width at installation and may separate to further increase the expansion joint width to fifty percent (50%) greater than the expansion joint width at installation. The resiliently compressible material for the core 102 is selected to accommodate the reduction and expansion of the expansion joint while maintaining sufficient force against the face of each substrate to maintain a seal. Because the cycling of the expansion joint may occur daily, as the substrates heat and cool, the resiliently compressible material for the core 102 is selected to function after thousands, and preferably, hundreds of thousands of cycles. The core 102 has an elongate body 110.

The sensor 106 is positioned so a sensor external surface 114 contacts the core 102. When desire, the sensor 106 may be positioned on the core 102 or may be positioned to extend into the core 102 without extending external the core 102. The sensor 106 may be one or more of a temperature sensor, a force sensor, a gas sensor, a chemical sensor, a humidity sensor, a position sensor, a tilt sensor, a water sensor, a strain sensor, a radiation sensor, a particle sensor and an accelerometer. The sensor 106 has a sensor top 112. The sensor 106 may be positioned so the sensor top 112 is flush with or below the surface of the core 102 or so the sensor 106 is encapsulated within the core 102.

The sensor 106 is imposed into the core 102 after the core 102 is formed, but prior to any compression, whether in the field or at the factory. To reduce the potential for the sensor 106 to work loose from the core 102 or otherwise shift position, the sensor 106 has at least one of a coefficient of friction of 0.4 or greater on its sensor external surface 114 or a barb 116. The coefficient of friction of 0.4 causes the sensor 106 to resist movement relative to the core 102 during operation, which includes compression and expansion. The barb 116 protrudes from the sensor 106 into the core 102, resisting any movement which would dislodge the sensor 106.

The sensor-signal receiving device 108 is selected from the group consisting of a passive, low frequency transponder and a microcontroller, and is in electrical communication with the sensor 106 and is configured to receive a sensor signal from the sensor 106. The sensor-signal receiving device 108 thereby provides an update of internal conditions of the core 102 in response to a signal from a reader or other device. When the sensor-signal receiving device 108 is a passive low-frequency transponder, limited data—particularly then-current conditions or pre-programmed fixed conditions, such as manufacture data, can be provided.

When desired, the core first side 136, and the opposing core second side, may be coated, infused, or impregnated with an adhesive to provide a mechanical bond between the core 102, and therefore the seal 100, and the substrates of the associated expansion joint. The adhesive 132 may be provided in such quantities that some portion may be expelled from the seal 100 after being bent into position to ensure a sufficient amount within the seal 100 and to provide a further seal external the seal 100 where a portion of the adhesive 132 is expelled. The adhesive 132 may be selected from known compounds, including glues, elastomers, cyanoacrylates, and chemical bonding agent, which cause the two surfaces to adhere together or creates a chemical bond.

The selection of the sensor-signal receiving device 108 may be driven by space and the extent of data desired and under what conditions. When the sensor-signal receiving device 108 is a microcontroller 124, data may be more dynamic, including any changes in condition since installation.

When desired, the microcontroller 124 may be in communication with at least one transmitter 122 from the group consisting of a transceiver, a cellular wireless transmitter, an electronic reader, a wireless repeater, and a cellular repeater, which may be positioned in the core 102. The positioning of a transmitter 122 in the core 102 may avoid the need for on-site access and inspection of the seal 100. Moreover, the transmitter 122 may facilitate the obscuring of repeaters and antennae, notably cellular antenna which can create difficulties when trying to erect on towers. Inclusion in an expansion joint, or other joint, permits such a transmitter 122 to be obscured. Further, the inclusion of a transmitter 122 may be particularly beneficial in connection with high-capacity venues, such as stadiums, where expansion joints are present, and where communication systems, particularly cellular and wifi, may be unable to carry the imposed load with conventional antennae. Additionally, the inclusion of a transmitter 122 may provide a repeater system for implanted medical devices, such as pacemakers, glucose monitors, and the like, to provide a communications system in case of an alert and provide some identification of general location. If a pacemaker issued an alert, the use of a transmitter 122 could reduce the time for medical intervention.

The microcontroller 124 may be configured to communicate a distress signal upon the sensor 106 identifying a condition selected from the condition group consisting of a temperature of at least 300 F, water contact, an impact of at least 5000N, damage to the sensor, the presence of selected radiological compounds, and the presence of chemical compounds.

To provide such operation, the microcontroller 124 may be in communication with a first power supply 126 selected from the group consisting of a battery, a vibration energy harvester, capacitor, or a thermoelectric, or a photovoltaic cell, or an external power supply 128. The first power supply 126 may be positioned within the core 102. The first power supply 126 may be selected according to the desired purpose and operation. A battery may be used as the first power supply 126 when a constant power supply is needed, particularly when external power cannot be used. A vibration energy harvester, powered by the operation of the expansion joint, may be used as the first power supply 126 as it can provide longer term operation without the potential for battery failure and the effect of environment on the battery. When the first power supply 126 is a thermoelectric generator, it may penetrate from at or near the core first side 136 or the core top surface 208 toward the center of the core 102, and thus be positioned essentially within the core 102 such that temperature variations may generate electricity. Temperature variations caused by sunlight, or atmospheric heating/cooling, or even fire events, may generate sufficient variations, particularly given the heating characteristics of the adjacent substrates and the insulating properties of the core 102, to provide sufficient electrical power. When the first power supply 126 is a photovoltaic cell, the cell must be placed external the core 102 and the elastomeric layer 104. A capacitor can likewise provide a power supply, assuming a connection with some other power supply, and charged with a trickle current. While beneficial for vertical surfaces or rooftop installations, photovoltaic cells may be undesirable for horizontal and ground level installations because of the associated traffic. The external power supply 128, as an alternative to the internal power supply and photovoltaic cell, may be used, but while providing a more stable power supply, requires connection to an external source. When the first power supply 126 is a battery, the battery may be in electrical connection with a supplemental power supply 130 selected from the group consisting of a vibration energy harvester, a photovoltaic cell, a capacitor, and a supplemental external power supply.

Moreover, the microcontroller 124 may be in communication with a system transponder 134, which may be positioned within the core 102. When desired, the seal 100 may provide a seal of an expansion joint, incorporate an electric reader, such as those used in connection with tollways or RFID product inventory trackers, and transmit the associated data to a central collection system such as by the wireless repeater, cellular repeater or cellular antennae, as well as any other transmission system. An external computer may run an application software tool with a user interface may be provided to communicate with and, when desired, manage the microcontroller 124.

Likewise, with the sensor 106 and any transmission system, the health of a seal can be determined remotely, including by local inspection or vehicle proximity.

When desired, the core 102 may have other attributes to facilitate its function. To ensure the elongate body 110 of the core 102, the core 102 may have a core length 120 at least five times a core width 118 when the core 102 is not compressed.

The core 102 may be composed of foam, such as an open-celled polyurethane foam. Any of various types of foam known in the art may be used, including compositions such as polyurethane and polystyrene, and may be open or closed cell. Typical foams would polyether or polyester polyurethane foam but other foams with special properties such as melamine or silicone foams are advantageous for high fire-resistance. When foam is used, it may have a treatment, such as impregnation, to increase desirable properties, such as fire resistance or water resistance, by, respectively, the introduction of a fire retardant into the foam or the introduction of a water inhibitor into the foam. Further, the foam may be composed of a hydrophilic material, a hydrophobic material, a fire-retardant material, or a sintering material. Moreover, the foams used may be partially closed cell or viscoelastic foams. Alternatively, the core 102 may be a non-foam material which exhibits properties of compressibility, expansion, resiliency, such as rubber or cellulose or other material.

Figure 2:
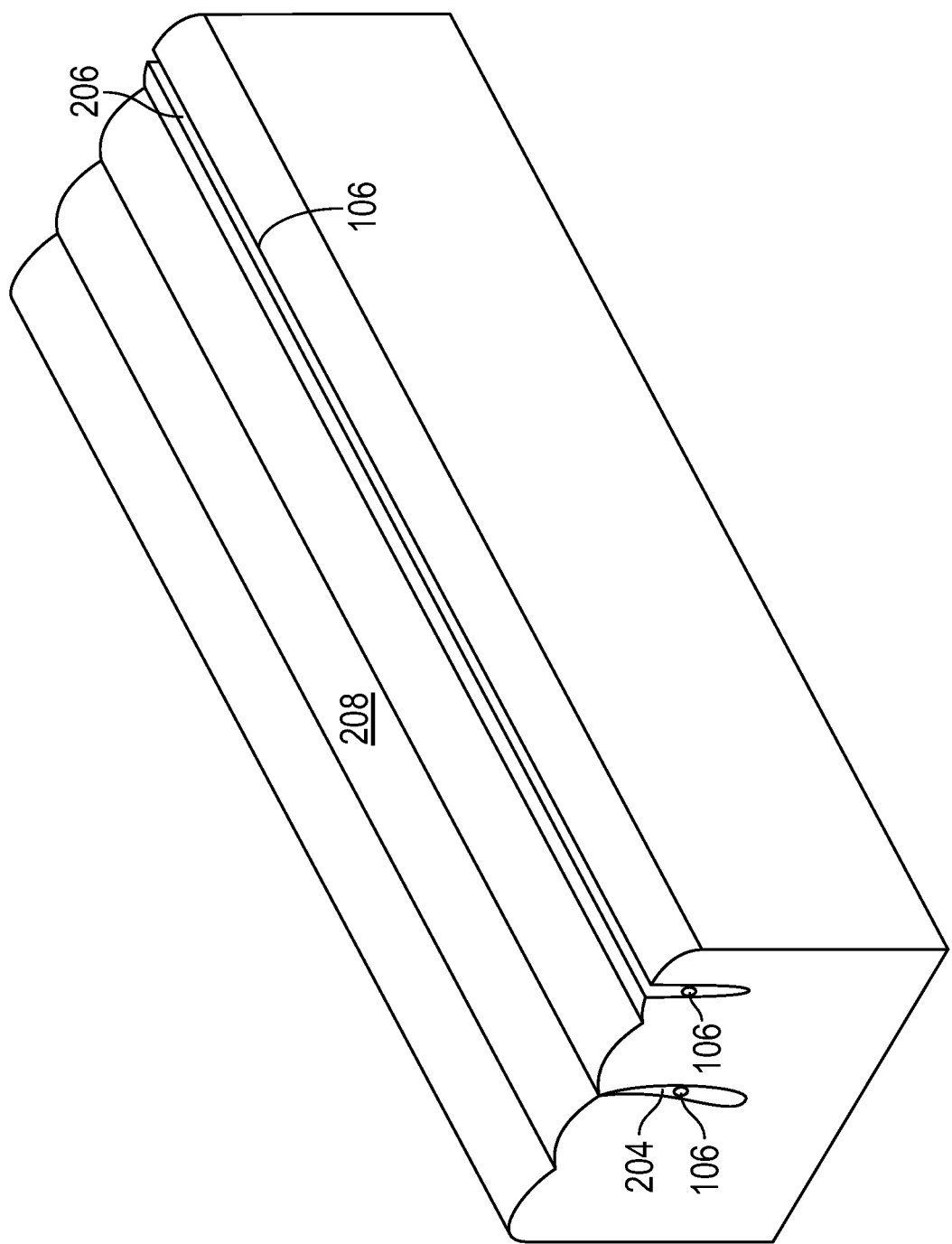
FIG. 2 provides an isometric view of the core of the expansion joint seal.

Referring to FIG. 2, an isometric view of the core 102 of the seal 100 is provided. The sensor 106 may be positioned within an elongate downward incision 204 into the core 102 from a core top surface 208. Likewise, the sensor 106 may be positioned within an elongate void 206 extending downward into the core 102 from a core top surface 208. The inclusion of an elongate downward incision 204 or an elongate void 206 in the core 102 provides a location for the sensor 106 and other components without potential for damaging the core 102. The inclusion of the elongate downward incision 204 is readily provided by cutting the core 102 with a blade. The inclusion of the elongate void 206 is readily provided by cutting the core 102 after formation of the core 102, particularly if foam, whether by a cutting system or extrusion. Likewise, the first power supply 126, such as the thermoelectric generator, may be positioned within the elongate downward incision 204 into the core 102 from the core top surface 208. The thermoelectric generator may therefore extend into the elongate downward incision.

Figure 3:
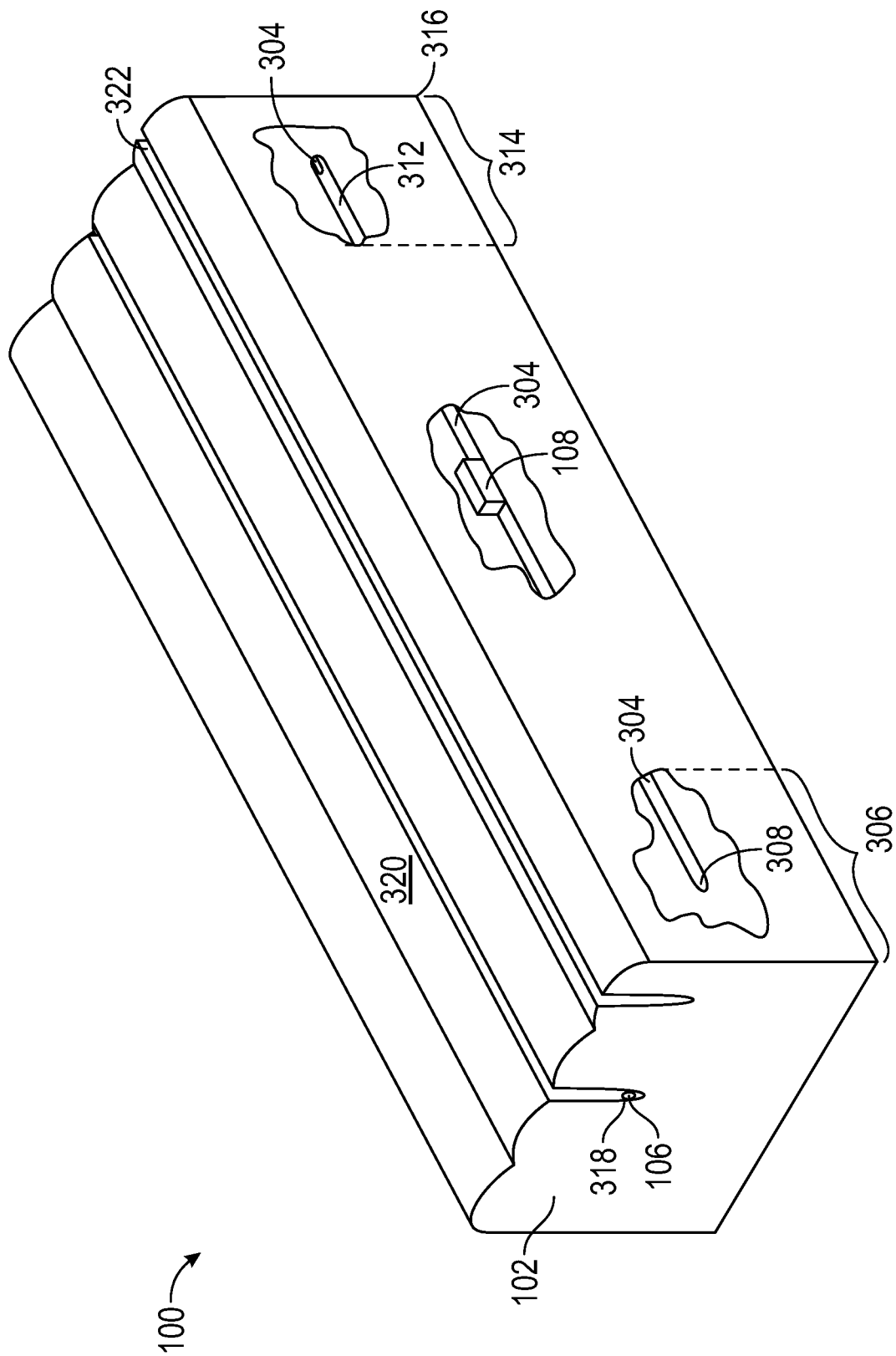
FIG. 3 provides an isometric view of an embodiment with an elongate sensor body.

Referring to FIG. 3, an isometric view of an alternative embodiment with an elongate sensor body 304 is provided. When desired, the sensor 106 may have an elongate sensor body 304. Such an elongate sensor body 304 may provide detection over a distance. The elongate sensor body 304 may then terminate at a sensor first end 308 within a core first section 306 where the core first section 306 terminates at a core first end 310. Likewise, the elongate sensor body 304 may terminate at a sensor second end 312 within a core second section 314, where the core second section 314 terminates at a core second end 316. The sensor 106 thus extends from the sensor first end 308 to the sensor second end 312. The elongate sensor body 304 may have at least one sensing device selected from the sensor group consisting of a temperature sensor, force sensor, gas sensor, chemical sensor, humidity sensor, position sensor, tilt sensor, water sensor, strain sensor, radiation sensor, particle sensor and accelerometer.

As with a single sensor 106, the elongate sensor body 304 may be positioned within an elongate downward incision 318 into the core 102 from a core top surface 320. Likewise, the sensor 106 may be positioned within an elongate void 322 extending downward into the core 102 from a core top surface 320. An elongate sensor body 304 may provide the same sensor details as the single small sensor but also provide the detail along the body of the seal 100. Further, the elongate sensor body 304 may provide additional sensing options, including stress, strain, and fractures within the seal 100.

When desired, the sensor 106 in each seal 100 may be in communication with one or more nearby sensors 106 via the associated sensor-signal receiving device 108, such by wife or Bluetooth communication for wireless communication, or may be coupled together, such as by use of physical connectors. Thus, the seal 100 may have one or more sensors 106 within the core 102 in series or in parallel either via solid-state or wireless systems, which may be connected together, such as in a daisy chain.

Figure 4:
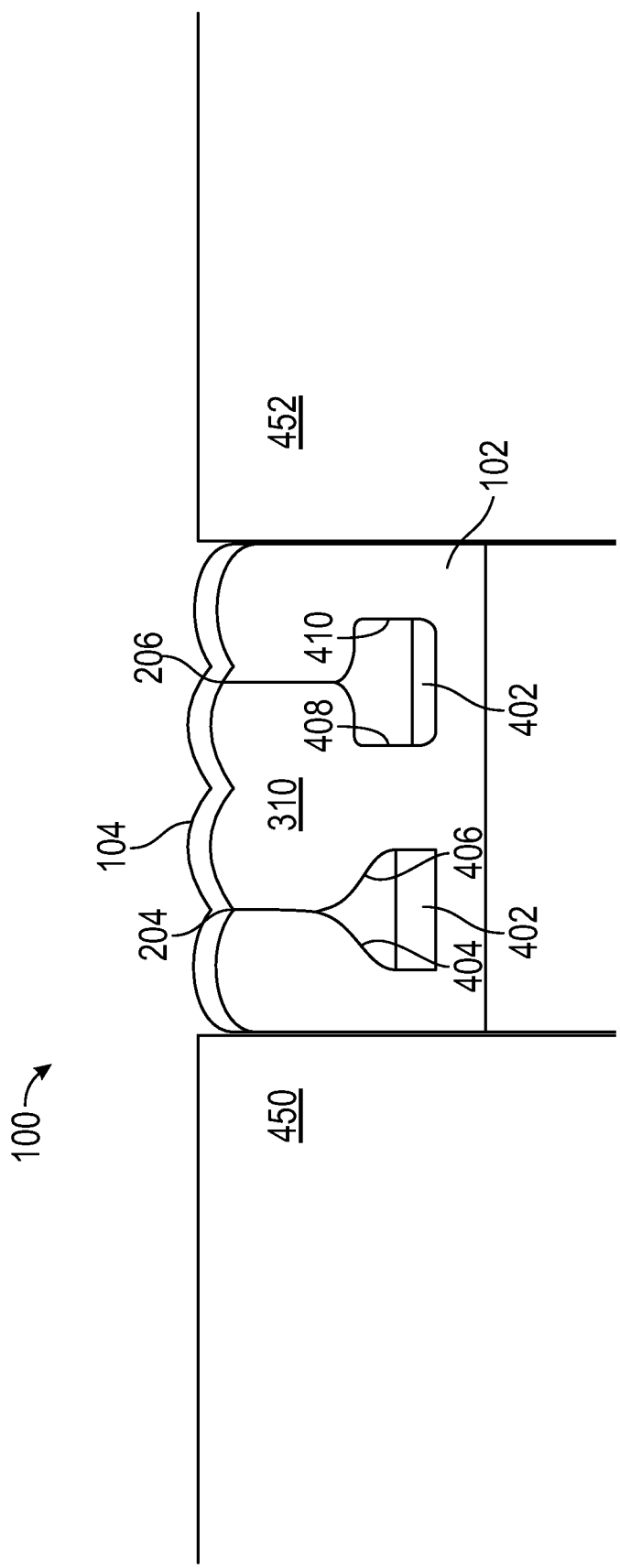
FIG. 4 provides an end view of a construction of the present invention including a vibration energy harvester.

Referring to FIG. 4, an end view of a construction of the present invention including a vibration energy harvester as the first power supply 126 is provided. Vibration energy harvesting is to transform the ambient mechanical energy to electricity. Such systems are well-known and include transductions based on electromagnetic effect, electrostatic effect, and piezoelectric effect. When used, a vibration energy harvester 402 is positioned in the elongate downward incision 204 or the elongate void 206. When the vibration energy harvester 402 is positioned in the elongate downward incision 204, the vibration energy harvester 402 contacts an elongate downward incision first side 404 of the elongate downward incision 204 and an elongate downward incision second side 406 of the elongate downward incision 204. When the vibration energy harvester 402 is positioned in the elongate void 206, the vibration energy harvester 402 contacts an elongate void first side 408 of an elongate void 206 and an elongate void second side 410 of the elongate void 206. Thus, when a distance between a first substrate 450 and a second substrate 452 changes, the vibration energy harvester 402 generates energy.

Figure 5:
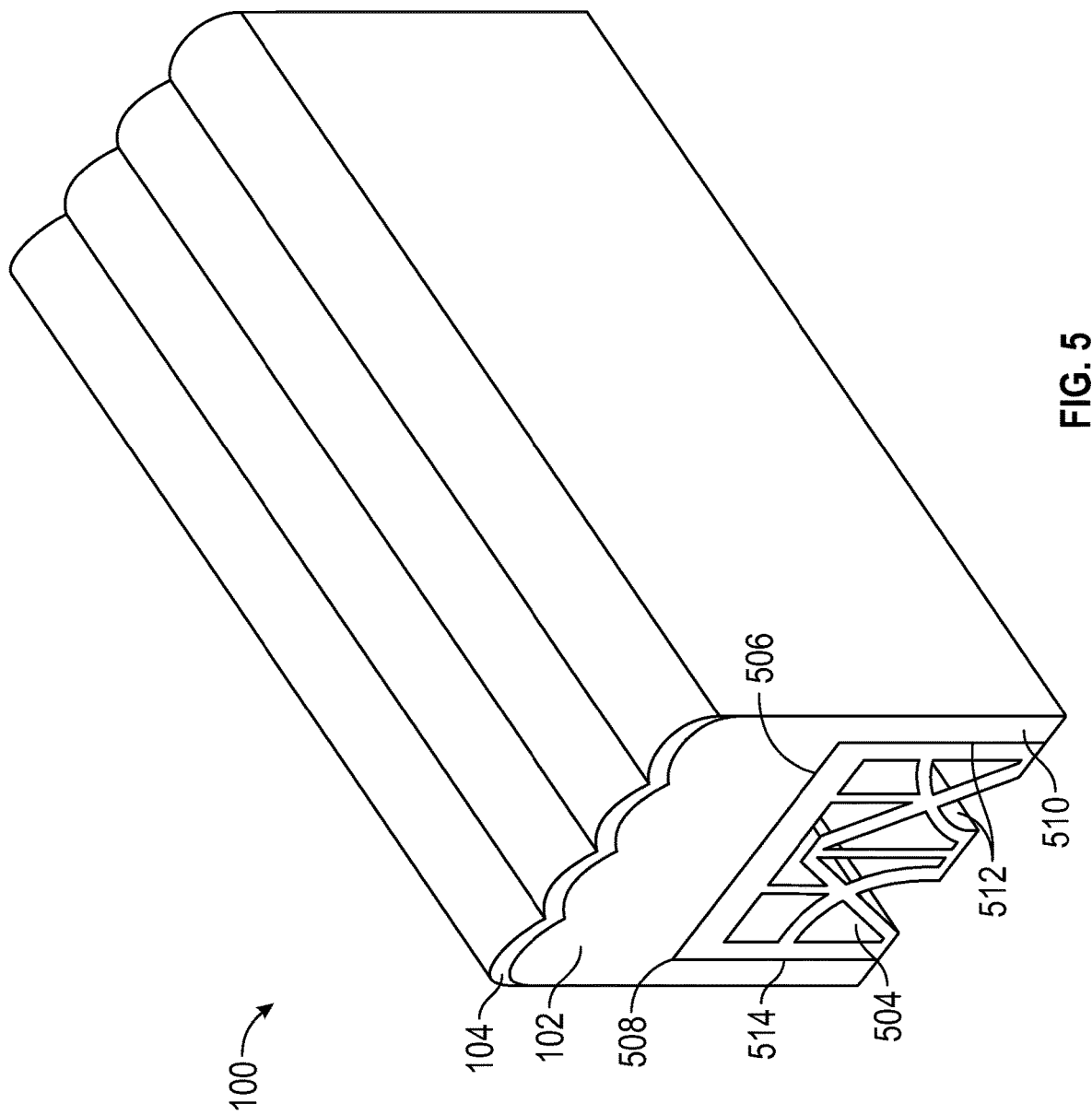
FIG. 5 provides an isometric view of an alternative construction of the present invention is provided.

Referring to FIG. 5, an isometric view of an alternative construction of the present invention is provided. The seal 100 may further include an elastomeric gland 504 for increased rigidity. Such an elastomeric gland 504 would have a gland top 506 contacting a core bottom 508 of the core 102. When desired, the elastomeric gland 504 maintained relative to the core 102, such as by an adhesive contacting the core bottom 508 and the gland top 506 and a core downward extension 510 of the core 102, where the core downward extension 510 contacts the elastomeric gland 504 on a first gland side 512 and a second gland side 514, the first gland side 512 opposite the second gland side 514. An elastomeric gland 504 may provide additional benefits to the seal 100. The inclusion of the elastomeric gland 504 may provide benefits, such as increased movement range, durability, and resistance to environmental factors.

As a result, the present invention provides a seal 100 which may provide details on interior conditions, avoiding the need for preventative replacement, and which may be used to augment or replace existing systems including proximity detectors and transmitters for vehicles and inventory or to provide location for radio transmission, including WIFI and cellular networks. Such systems may be internally powered, including by batteries or other power supplies, or may be externally powered of supported.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

We claim:

1. A seal for an expansion joint, comprising
a core of a resiliently compressible material, the core having an elongate body;
a sensor,
the sensor having a sensor top and a sensor external surface, the sensor external surface contacting the core, the sensor external surface having one of a coefficient of friction of 0.4 or greater or a barb,
the sensor configured to emit a sensor signal;
a sensor-signal receiving device selected from the group consisting of a passive, low frequency transponder and a microcontroller, the sensor-signal receiving device configured to receive the sensor signal; and
the sensor in electrical communication with the sensor-signal receiving device.

2. The seal of claim 1, wherein the core has a core length at least five times a core width.

3. The seal of claim 2, wherein the core is composed of foam.

4. The seal of claim 3, further comprising an elastomeric gland, the elastomeric gland having a gland top contacting a core bottom of the core.

5. The seal of claim 4, wherein the elastomeric gland maintained relative to the core by one of an adhesive contacting the core bottom and the gland top and a downward extension of the core, the downward extension of the core contacting the elastomeric gland on a first gland side and a second gland side, the first gland side opposite the second gland side.

6. The seal of claim 1, wherein the sensor has an elongate sensor body,
the elongate sensor body terminating at a sensor first end within a core first section, the core first section terminating at a core first end,
the elongate sensor body terminating at a sensor second end within a core second section, the core second section terminating at a core second end,
the sensor extending from the sensor first end to the sensor second end.

7. The seal of claim 6, wherein the elongate sensor body has at least one sensing device selected from the sensor group consisting of a temperature sensor, force sensor, gas sensor, chemical sensor, humidity sensor, position sensor, tilt sensor, water sensor, strain sensor, radiation sensor, particle sensor and accelerometer.

8. The seal of claim 1, wherein the sensor has at least one sensing device selected from the sensor group consisting of a temperature sensor, force sensor, gas sensor, chemical sensor, humidity sensor, position sensor, tilt sensor, water sensor, strain sensor, radiation sensor, particle sensor and accelerometer.

9. The seal of claim 6, wherein the elongate sensor body is positioned within an elongate downward incision into the core extending from the core first section to the core second section from a core top surface, the elongate downward incision not penetrating to a core bottom surface.

10. The seal of claim 1, wherein sensor is positioned within an elongate downward incision into the core from a core top surface.

11. The seal of claim 6, wherein the elongate sensor body is positioned within an elongate void extending downward into the core from a core top surface and extending from the core first section to the core second section from a core top surface, the elongate void not penetrating to a core bottom surface.

12. The seal of claim 1, wherein the sensor is positioned within an elongate void extending downward into the core from a core top surface.

13. The seal of claim 12, wherein the microcontroller is in communication with at least one of a first power supply selected from the group consisting of a battery, a vibration energy harvester, a capacitor, a photovoltaic cell, an external power supply, and a thermoelectric generator.

14. The seal of claim 13, wherein the vibration energy harvester contacts a first side of the elongate downward incision and the vibration energy harvester contacts a second side of the elongate downward incision.

15. The seal of claim 13, the battery is in electrical connection with a supplemental power supply selected from the group consisting of a vibration energy harvester, thermoelectric generator, a photovoltaic cell, a capacitor, and an external power supply.

16. The seal of claim 1, wherein the microcontroller is in communication with at least one transmitter from the group consisting of a transceiver, a cellular wireless transmitter, an electronic reader, a wireless repeater, and a cellular repeater.

17. The seal of claim 16, wherein the microcontroller is configured to communicate a distress signal upon the sensor identifying a condition selected from the condition group consisting of a temperature of at least 300 F, water contact, an impact of at least 5000N, damage to the sensor, the presence of selected radiological compounds, and the presence of chemical compounds.

18. The seal of claim 16, wherein the transmitter is encapsulated within the core.

19. The seal of claim 1, wherein the microcontroller is in communication with a system transponder.

20. The seal of claim 13, wherein the thermoelectric generator extends into the elongate downward incision.

* * * * *